United States Patent [19]

Mead

[11] Patent Number: 4,576,320
[45] Date of Patent: Mar. 18, 1986

[54] EYEGLASS HOLDER FOR OPERATIVE ASSOCIATION WITH THE REAR VIEW MIRROR ON A VEHICLE

[76] Inventor: F. Jerome Mead, 37 Clinton Pl., Morristown, N.J. 07960

[21] Appl. No.: 676,520

[22] Filed: Nov. 29, 1984

[51] Int. Cl.$^4$ .............................................. B60R 7/00
[52] U.S. Cl. .................................. 224/311; 224/273; 224/42.42; 248/DIG. 2
[58] Field of Search ............... 224/311, 312, 273, 277, 224/42.42, 42.45, 42.43; 108/44, 45; D12/188; 248/DIG. 2; 24/3 C

[56] References Cited

U.S. PATENT DOCUMENTS

| D. 234,592 | 3/1975 | Callaway | D12/188 X |
| 1,487,574 | 3/1924 | Jordan | 224/277 |
| 1,974,661 | 9/1934 | Singer | 224/277 X |
| 2,524,617 | 10/1950 | Wyse | 224/42.43 X |
| 2,735,597 | 2/1956 | Treleven | 224/273 |
| 2,884,219 | 4/1959 | Glover | 248/DIG. 2 |
| 3,104,895 | 9/1963 | Feuerbach et al. | 108/45 X |
| 3,552,701 | 1/1971 | Montagano | 248/DIG. 2 |
| 4,450,989 | 5/1984 | Bogar, Jr. | 211/64 X |

FOREIGN PATENT DOCUMENTS

| 415105 | 12/1966 | Switzerland | 248/DIG. 2 |
| 891818 | 3/1962 | United Kingdom | 248/DIG. 2 |

*Primary Examiner*—Stephen Marcus
*Assistant Examiner*—Robert Petrik
*Attorney, Agent, or Firm*—Daniel H. Bobis

[57] ABSTRACT

A spectacle holder for use in conjunction with a rear view mirror of an automotive or other vehicle includes, a receptacle having a substantially flat support base for supporting a pair of spectacles, and at least one peripheral wall; a restraining hook secured to the peripheral wall at the front end of the receptacle; an elastic strap secured to the peripheral wall at the opposite side of the receptacle and adapted to be stretched around the restraining hook so as to releasably engage the pair of spectacles to retain the latter in the receptacle; and a mounting arrangement for mounting the receptacle adjacent the top or upper edge of the rear view mirror so that the support base will be positioned in a substantially horizontal plane, the mounting arrangement in a first embodiment including two suction cups which adhere to the front windshield of the vehicle and which are slidably connected in the widthwise direction of the receptacle at opposite sides thereof by stems, and in a second embodiment, hook members positioned at the bottom of the support base at opposite sides and toward the front thereof for engaging the upper or top edge of the rear view mirror and hook ends disposed at opposite sides of the support base toward the rear thereof and connected thereto through respective springs, for engaging the lower or bottom edge of the rear view mirror.

3 Claims, 8 Drawing Figures

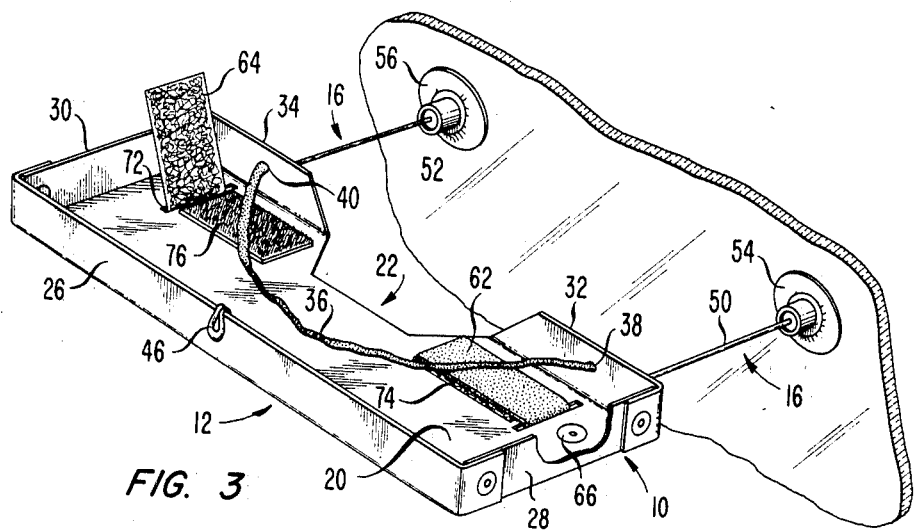
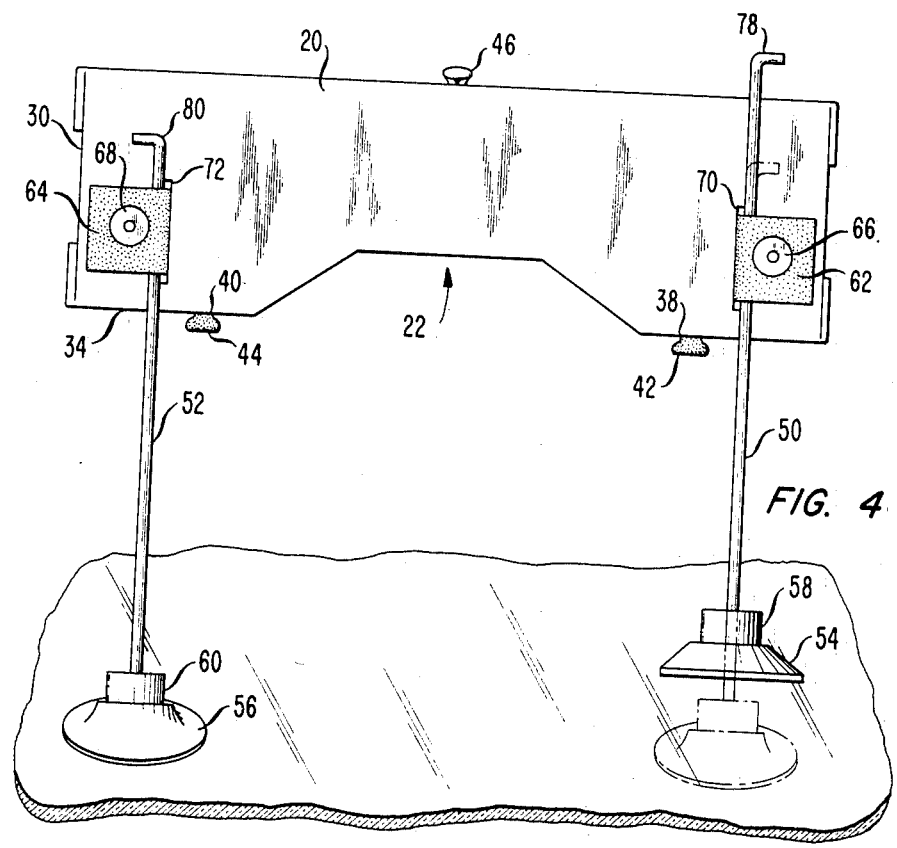

EYEGLASS HOLDER FOR OPERATIVE ASSOCIATION WITH THE REAR VIEW MIRROR ON A VEHICLE

BACKGROUND OF THE INVENTION

This invention relates generally to support brackets and is more particularly directed to a spectacle holder removably connected adjacent the top of the rear view mirror.

Sunglasses for reducing glare are commonly used when driving an automobile, truck or the like. However, the sunglasses need not always be worn and, in some cases, cannot be worn, for example, during night driving, on cloudy days and while driving through a tunnel. During the times that the sunglasses are not worn, it is desirable to store the sunglasses in a safe, yet accessible place.

Generally, sunglasses are stored in some type of storage compartment, on the seat, or on the dashboard of the vehicle in which they are used. When the glasses are placed in a storage compartment, they are not readily accessible. If placed on the vehicle's seat, there is a danger that someone may sit on them or that young children may play with and break the sunglasses. And, if the sunglasses are placed on the dashboard of the vehicle, the sunglasses have a tendency to fall off the dashboard onto the floor during sharp turns. The above also applies to spectacles which are kept in the vehicle for various purposes.

In order to overcome the aforementioned problems, various types of holders have been proposed for safely storing sunglasses and spectacles and which also provide ready access thereto.

For example, U.S. Pat. No. 2,735,597 discloses a spectacle holder consisting of a case for holding the spectacles and having a hinged top. The spectacle case is secured to the sun visor of the vehicle, by means of hooked hangers secured to the upper end of the spectacle case and which hook around the top edge of the visor and a hook which is connected to the bottom portion of the spectacle case through a tension spring and which hooks around the lower edge of the visor, so as to secure the spectacle holder to the visor.

U.S. Pat. No. 3,552,701 discloses a sunglass holder which is secured directly to the rear view mirror or to the support for the rear view mirror. In the embodiment in which the sunglass holder is secured directly to the rear view mirror, inverted triangular-shaped holding members, through which the legs of the sunglasses frame extend, are secured to the upper edge of the rear view mirror for holding the sunglasses.

U.S. Pat. No. 2,467,251 is directed to an eyeglass holder which is attached to a convenient portion of a vehicle dashboard or the like by a suction cup and includes spaced resilient jaws for grasping the eyeglasses.

U.S. Pat. No. 2,522,909 discloses a main body secured to a wall by suction cups and the top of which has an opening closed by a slidably connecting tray shaped to receive a pair of eyeglasses.

The present invention provides an improved relatively sturdy and simple, sunglass or spectacle holder to overcome the above enumerated problems which can be removably connected adjacent to the top of the conventional rear view mirror on a vehicle not only to store the sunglasses or spectacles but additionally to make them readily available, if needed.

OBJECTS AND SUMMARY OF THE INVENTION

Accordingly, it is an object of the present invention to provide a spectacle holder which provides for easy and accessible storage of sunglasses in an automotive vehicle.

It is another object of the present invention to provide a spectacle holder for storing sunglasses during non-use thereof in an automotive vehicle and which is used in connection with the rear view mirror of the vehicle.

It is still another object of the present invention to provide a spectacle holder which can be removably installed in automotive vehicles currently in use and which is relatively economical to manufacture.

Thus, the present invention covers, a spectacle holder for operative use and association with the rear view mirror of an automotive or other vehicle, comprising, receptacle means including, a substantially flat support for a pair of spectacles; means connected to said receptacle means for releasably engaging said pair of spectacles to retain the latter on said support, and mounting means for mounting said receptacle means on top of said rear view mirror with the support thereof positioned in a generally horizontal plane.

In accordance with a first embodiment of the present invention, the mounting means takes the form of bracket means secured at one end to the receptacle means and having suction cups at the ends remote therefrom which are connectible to the front windshield of the automotive vehicle.

In accordance with a second embodiment of the present invention, the mounting means comprises upper hook members secured to the receptacle means and which hook over the top of tbe rear view mirror, and lower hook members secured to the receptacle means by springs which extend rearwardly of and hook to the lower edge of the rear view mirror.

The above, and other, objects, features and advantages of the present invention will become readily apparent from the following detailed description thereof which is to be read in connection with the accompanying drawings.

BRIEF DESCRIPTION OF THE DRAWINGS

FIG. 3 is a perspective view of the form of invention shown in FIG. 1 taken from the right side with the mirror removed.

FIG. 4 is a bottom planar view with the rear view mirror removed showing one of the support means of the bracket in the attached position on the windshield and the other support arm in the unattached position in solid lines and the attached position in dotted lines.

DETAILED DESCRIPTION OF PREFERRED EMBODIMENTS OF THE INVENTION

Referring initially to FIGS. 1 to 4 of the drawings, a spectacle holder generally designated 10 in accordance with a first embodiment of the invention is shown in operative association and disposed adjacent the upper edge of a conventional rear view mirror for an automotive vehicle with bracket means to connect the spectacle holder to the inner surface of an associated windshield on the vehicle.

In the second embodiment of the invention to be hereinafter described as shown in FIGS. 5 to 8 of the drawings the rear view mirror is not connected to the windshield of the vehicle.

Figure 1:
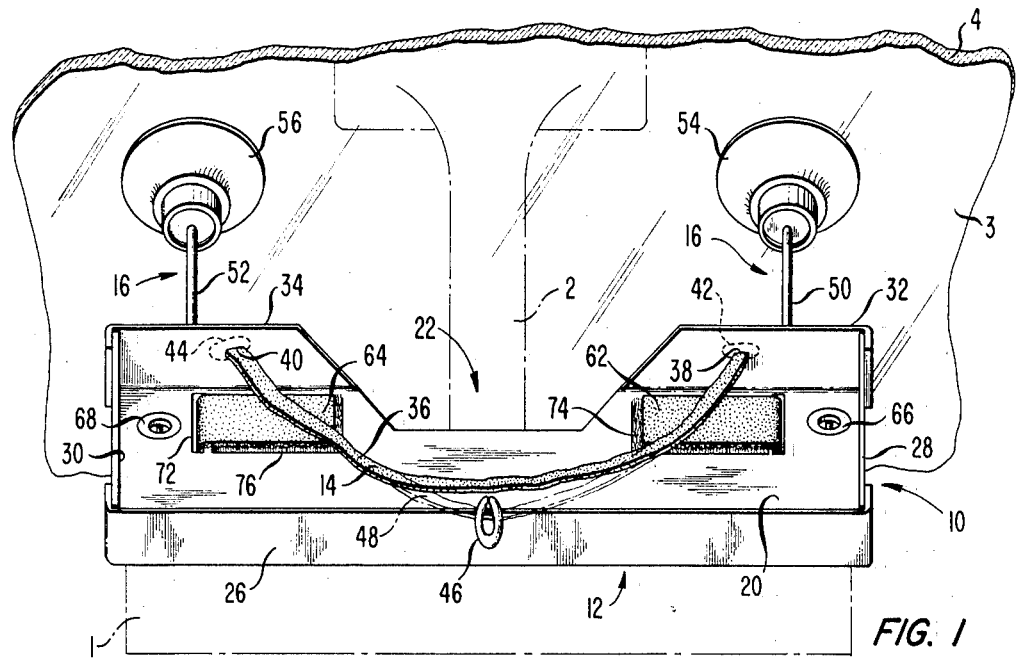
FIG. 1 is a perspective view, looking from the top, of a spectacle holder according to one embodiment of the present invention.
Figure 2:
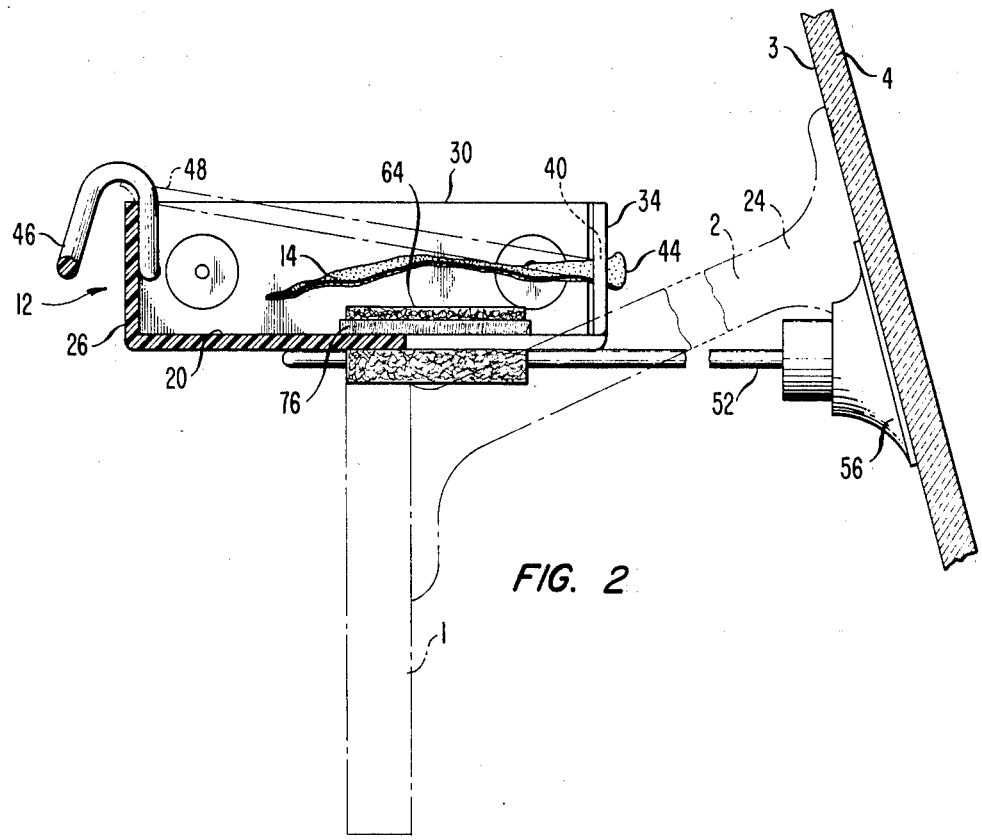
FIG. 2 is a side view partially in vertical section of the form of the invention shown in FIG. 1 showing the spectacle holder disposed in assembled relation to the windshield and the rear view mirror on a vehicle.

FIGS. 1 and 2 show for the first embodiment of the invention that the rear view mirror 1 is connected to one end of a bracket arm 2 which in this form of the invention is in turn connected by any suitable adhesive to the inner face 3 of the windshield 4 of the vehicle. The use of a rear view mirror on automotive and other types of vehicles are well known and require no further description for those skilled in the art will readily understand the relationship of the spectacle holder in accordance with the present invention and such rear view mirror. It will be understood that the present invention is adapted for use with any type of rear view mirror on any given type of vehicle which utilizes such mirrors.

FIGS. 1 TO 4 FORM OF THE INVENTION

Spectacle holder 10 includes, receptacle means 12 for supporting a pair of spectacles, such as sunglasses or the like. Releasable securement means 14 is connected to receptacle means 12 for releasably holding the spectacles in the receptacle means, and a mounting or bracket means 16 is provided to permit the receptacle means 12 to connect to the top or upper edge of the rear view mirror 18 such that receptacle means 12 is positioned in a substantially horizontal plane.

FIGS. 1 to 4 further show that the receptacle means 12 is formed and sized as a substantially flat support base 20 on which the pair of spectacles can be easily supported. Support base 20 is preferably cut away, as at 22, at the rear thereof to prevent interference with the support stem or bracket arm 2 of rear view mirror 1 when spectacle holder 10 is in assembled position thereon. The exact configuration of the cut-out 22 can vary within the scope of the present invention. Preferably, cut-out 22 is cut in about three-fourths of an inch so that the base 20 rests on the mirror without interference with bracket arm 2, regardless of whether bracket arm 2 extends from the windshield 4, or from the ceiling of the vehicle, at a slant or otherwise.

Receptacle means 12 further includes an upwardly inclined front flange or vertical front wall 26 which may be integral with support base 20. In addition, vertical or upwardly inclined side flanges or side walls 28 and 30, and rear flanges or rear walls 32 and 34 on opposite sides of cut-out section 22 are also provided.

Preferably, no upwardly inclined flanges or walls are connected with support base 20 at cut-out section 22 thereof.

Releasable securement means 14 may be formed from an elastic strap 36 having opposite free ends which extend within apertures 38 and 40 within rear walls 32 and 34, respectively, of receptacle means 12 and which have enlarged or tied ends 42 and 44, respectively, to connect elastic strap 36 to receptacle means 12.

A restraining hook 46 is secured to the front wall 26 of receptacle means 12 and is adapted to cooperate with elastic strap 36 for engaging the pair of spectacles and retaining the latter on support base 20. Thus, the pair of spectacles are placed on support base 20 and elastic strap 36 is pulled over the spectacles into engagement with restraining hook 46 secured to the front wall 26 of receptacle means 12, as shown by the dashed lines 48 in FIG. 1, to engage the pair of spectacles and retain the latter on support base 20.

As shown in FIGS. 1 and 2, mounting means 16 generally includes elongated stems 50 and 52 which are slidably connected to the underside of receptacle means 12 in the widthwise direction thereof, and suction cups 54 and 56 connected to the distal ends of stems 50 and 52, respectivley, and which are adapted to adhere to the inner face 3 of the windshield 4 of the vehicle. Generally, suction cups 54 and 56 contain hub sections 58 and 60, respectively, having central apertures (not shown) through which stems 50 and 52 are force fitted.

Stems 50 and 52 are slidably connected to the bottom of support base 20 by adjustable straps 62 and 64 which in turn, are secured at a respective end thereof to the bottom of support base 20 by rivots 66 and 68, respectively. The free ends of straps 62 and 64 extend through slits 70 and 72, respectively, arranged in the widthwise direction in support base 20, and are formed with a "Velcro" underside as they emerge above support base 20 for engagement with a "Velcro" base 74 and 76, respectively, fixed on support base 20, as shown in FIG. 1. With this arrangement, stems 50 and 52 are connected to receptacle means 12 for slidable movement in the widthwise direction thereof. By using the "Velcro" arrangement discussed above, the stems 50 and 52 and suction cups 54 and 56 can be removed from receptacle means 12 for compact shipping, and also, the support base 20 can be removed from stems 50 and 52, for cleaning or the like, without removing and subsequently realigning suction cups 54 and 56 on the windshield. In addition, in order to prevent stems 50 and 52 from escaping from straps 62 and 64, the ends thereof are bent as at 78 and 80.

With this arrangement, spectacle holder 10 is mounted adjacent the top or upper edge of rear view mirror 1, as shown in FIG. 3, with suction cups 54 and 56 adhered to the windshield 4 of the vehicle and with support base 20 being positioned in a substantially horizontal plane, that is, generally transverse or perpendicular with respect to the plane of rear view mirror 1.

In use, the driver places the sunglasses on top of support base 20 and then stretches elastic strap 36 around restraining hook 46 to engage the pair of spectacles so as to retain the latter on support base 20. The spectacle holder 10 also can hold the spectacles while the latter are in their carrying case.

Because the sunglass holder is mounted above the rear view mirror 1, there is no obstruction of the driver's view through the windshield of the vehicle.

FIGS. 5-8 FORM OF THE INVENTION

Referring now to FIGS. 5 to 8, a spectacle holder 110 according to a second embodiment of the present invention will now be discussed, in which elements correponding to those described above with reference to spectacle holder 10 of FIGS. 1 to 4 are identified by the same reference numerals with the numeral "1 or 2" in front thereof, and a detailed description thereof will be omitted herein for the sake of brevity.

Generally, spectacle holder 110 includes receptacle means 112 formed with a support base 120, front flane 126, side flange 128 and 130, and rear flanges 132 and 134, respectively. A restraining hook 146 is connected to front wall 126 and releasable securement means 114 is formed by an elastic strap 136 having enlarged ends 142 and 144 which is and restrained within apertures 138 and 140 within rear walls 132 and 134, respectively.

As in the first embodiment of FIGS. 1 to 4, elastic strap 136 is shown stretched around restraining hook 146 so as to engage the pair of sunglasses to retain the latter on support base 120.

Figure 5:
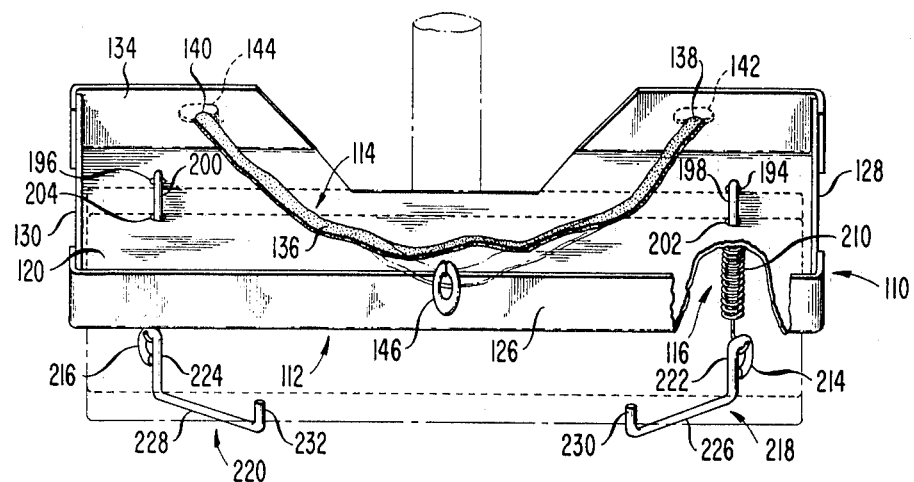
FIG. 5 is a perspective view, looking from the top, of a spectacle holder according to another embodiment of the present invention.

The distinction between the second and first embodiments is the mounting means 116. FIGS. 4 and 5 show that the mounting means 116 for this second embodiment of the invention includes L-shaped hook members 182 and 184 having a first leg 186 and 188, respectively, extending downwardly from the bottom of support base 120 at opposite sides and toward the rear thereof. First legs 186 and 188 include spring retaining bent ends 190 and 192 at the free ends thereof and at the opposite ends extend through apertures 194 and 196, respectively, at opposite sides and to the rear of support base 20 so as to connect with second legs 198 and 200, respectively, which are positioned in the widthwise direction of support base 120 at opposite sides thereof. Second legs 198 and 200 extend at their free ends thereof through apertures 202 and 204 formed in support base 120 at opposite sides and toward the front thereof, and terminate at the underside of support base 120 with hooked ends 206 and 208, respectively.

As shown in FIGS. 5 to 8, tension springs 210 and 12 are connected at first ends thereof to bent ends 190 and 192 of L-shaped hook members 182 and 184, respectively, and at their opposite ends are connected to respective spring retaining bent ends 214 and 216 of second L-shaped hook members 218 and 220 which have a configuration substantially identical to that of first L-shaped members 182 and 184. Thus, second L-shaped hook members 218 and 220 are formed with first legs 222 and 224, and second substantially perpendicular legs 226 and 228 with hooked ends 230 and 232 extending at the free ends thereof, respectively. First L-shaped hook members 182 and 184 generally form a mirror image with second L-shaped hook members 218 and 220, respectively, so that hooked ends 206 and 230 and hooked ends 208 and 232 are in general vertical alignment with each other.

Figure 6:
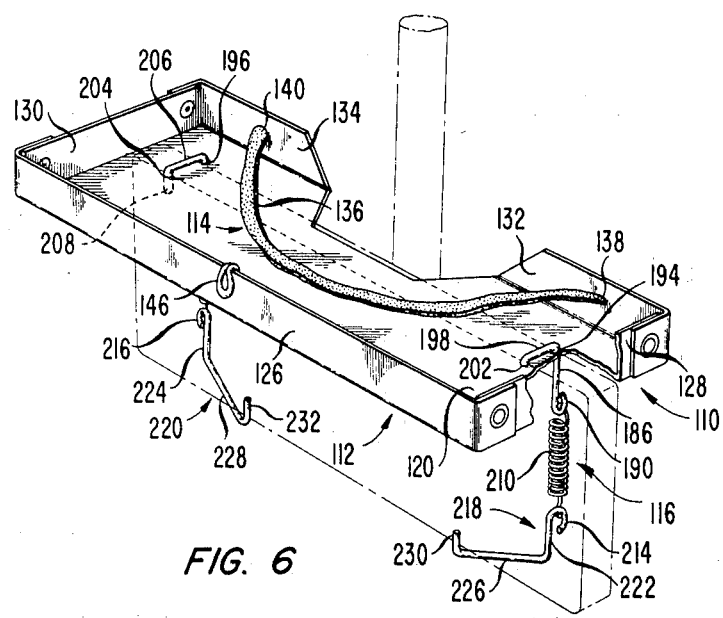
FIG. 6 is a perspective view of the form of the invention shown in FIG. 5 looking from the top of the spectacle holder and showing the spectacle holder mounted at the top of a rear view mirror shown in phantomized form.
Figure 7:
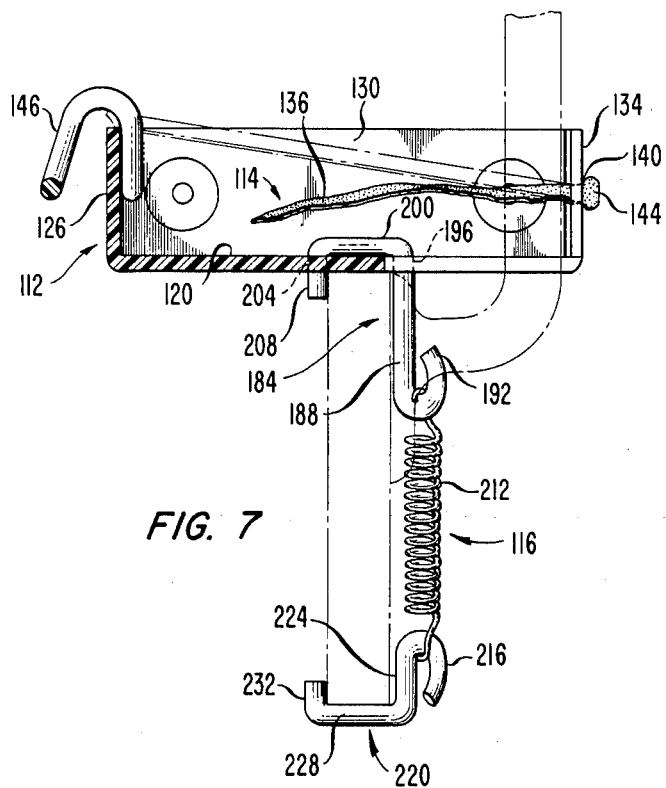
FIG. 7 is a side view partly in vertical section of the spectacle holder as shown in FIG. 5 showing the spectacle holder disposed in assembled position on the rear view mirror of a vehicle.
Figure 8:
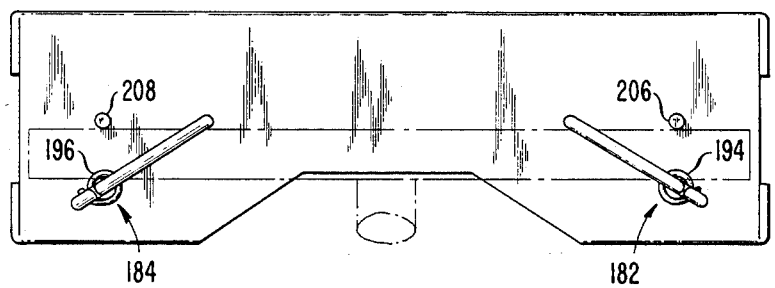
FIG. 8 is a bottom planar view of the spectacle holder shown in FIG. 7 with the rear view mirror in phantomized form.

In use, as shown in FIG. 6, hooked ends 206 and 208 hook over the top of rear view mirror 118 and hooked ends 230 and 232 hook over the lower end of rear view mirror 118 with legs 186, 188, 222, and 224 and springs 210 and 212 extending behind rear view mirror 118 so as not to obstruct the view thereof. Because springs 210 and 212 are provided, spectacle holder 110 can be used with rear view mirrors having different vertical heights. Again, as with spectacle holder 10 according to the first embodiment of FIGS. 1 to 4, spectacle holder 110 does not obstruct the view of the driver.

With this arrangement, support base 120 is positioned in a substantially horizontal plane, that is, substantially transverse or perpendicular with respect to the plane of the rear view mirror 118. The sunglasses are placed on top of support base 120 and elastic strap 136 is then hooked around restraining hook 146 so as to engage the pair of spectacles to retain the latter on support base 120.

Having described specific embodiments of the invention with reference to the accompanying drawings, it is to be understood that the present invention is not limited to those precise embodiments and that various changes and modifications may be effected therein by one of ordinary skill in the art without departing from the spirit and scope of the invention as defined by the appended claims.

What is claimed is:

1. A spectacle holder for use in conjunction with a rear view mirror of a vehicle, comrpising:
    a. receptacle means for supporting a pair of spectacles;
    b. means connected to said receptacle means for releasably engaging said pair of spectacles to retain the latter on said receptacle means; and
    c. mounting means for mounting said receptacle means adjacent the top of said rear view mirror so the receptacle means is positioned in a substantially horizontal plane,
    d. said mounting means including, suction cup means for engagement with a front windshield of said vehicle, stem means connected to said suction cup means and slidably connected to said receptacle means, and
    e. strap means connected to said receptacle means for releasably securing said stem means to said receptacle means for slidable movement relative said receptacle means.

2. A spectacle holder according to claim 1; wherein said strap means includes first end means secured to said receptacle means and second free end means; and said mounting means further includes adhering means secured to said receptacle means for adhering said free end means of said strap means thereto.

3. A spectacle holder according to claim 2; wherein said adhering means includes "Velcro" fasteners secured to said receptacle means and said free end means includes corresponding Velcro fasteners for releasably engaging said adhering means.

* * * * *